United States Patent
Huang et al.

(10) Patent No.: US 9,465,386 B2
(45) Date of Patent: Oct. 11, 2016

(54) MOBILE ROBOTIC TROLLEY-BASED PROCESSING SYSTEM AND MOBILE ROBOTIC TROLLEY THEREOF

(71) Applicant: USUN TECHNOLOGY CO., LTD., Taoyuan (TW)

(72) Inventors: Chiu-Fong Huang, Taoyuan (TW); Tai-Jui Su, Taoyuan (TW)

(73) Assignee: HONGFUJIN PRECISION ELECTRONICS (CHENG DU) CO., LTD., Chengdu Sichuan Province (CN)

( * ) Notice: Subject to any disclaimer, the term of this patent is extended or adjusted under 35 U.S.C. 154(b) by 410 days.

(21) Appl. No.: 14/187,762

(22) Filed: Feb. 24, 2014

(65) Prior Publication Data
US 2015/0241872 A1    Aug. 27, 2015

(51) Int. Cl.
*G05B 19/418* (2006.01)
*B08B 3/02* (2006.01)

(52) U.S. Cl.
CPC .......... *G05B 19/4189* (2013.01); *B08B 3/022* (2013.01); *Y02P 90/083* (2015.11); *Y02P 90/087* (2015.11); *Y02P 90/28* (2015.11); *Y10S 901/02* (2013.01); *Y10S 901/30* (2013.01)

(58) Field of Classification Search
CPC ... G05B 19/4189; B08B 3/022; Y02P 90/28; Y02P 90/083; Y02P 90/087
USPC ....................................................... 700/113
See application file for complete search history.

(56) References Cited

U.S. PATENT DOCUMENTS

| | | | | |
|---|---|---|---|---|
| 9,008,835 B2 * | 4/2015 | Dubrovsky et al. | . | G05B 19/409 700/245 |
| 2010/0062698 A1 * | 3/2010 | Vedsted | .................. | B08B 3/024 452/5 |
| 2013/0233922 A1 * | 9/2013 | Schoening | ........... | G06Q 10/087 235/385 |
| 2014/0309763 A1 * | 10/2014 | Messenger | ............. | G05B 15/02 700/117 |
| 2015/0136185 A1 * | 5/2015 | Jo | ........................... | B08B 3/022 134/103.2 |
| 2015/0301523 A1 * | 10/2015 | Fukao | .................... | H05K 13/08 700/112 |

FOREIGN PATENT DOCUMENTS

WO    WO 9608675 A1 *  3/1996  ................ B25J 5/02

OTHER PUBLICATIONS

Bassily et al., "A mechatronics educational laboratory—Programmable logic controllers and material handling experiments", Elsevier, 2006, 9pg.*

* cited by examiner

*Primary Examiner* — Ryan Coyer
(74) *Attorney, Agent, or Firm* — Muncy, Geissler, Olds & Lowe, P.C.

(57) ABSTRACT

A mobile robotic trolley-based processing system includes a conveyor platform including a conveying track, air supply valves arranged along the conveying track, a gantry support unit providing a catenary and a water supply unit, mobile robotic trolleys each including a wheeled trolley chassis movable along the conveying track, connectors connectable to the air supply valves for collecting compressed air, a pantograph kept in contact with the catenary for collecting electrical power, a robot arm for transferring profile materials individually, a cleaner having a water inlet pipe connectable to the water supply unit for collecting water or cleaning solution and a drive control system for controlling the operation of the robot arm and the cleaner, and machine tools for processing profile materials being transferred by the robot arm of each mobile robotic trolley.

11 Claims, 8 Drawing Sheets

MOBILE ROBOTIC TROLLEY-BASED PROCESSING SYSTEM AND MOBILE ROBOTIC TROLLEY THEREOF

BACKGROUND OF THE INVENTION

1. Field of the Invention

The present invention relates to profile material processing technology, and more particularly, to a mobile robotic trolley-based processing system, which allows a highly automated consistent processing operation, increasing the processing efficiency, simplifying the production line and reducing the processing cost. The invention relates also to a mobile robotic trolley used in this mobile robotic trolley-based processing system.

2. Description of the Related Art

At the present time, the manufacturing industry is facing the situation of shortage of labor, environmental consciousness and continuous rising in the cost of labor and management and the pressure of converting labor-intensive fabrication into technique-intensive fabrication. Manufacturers may hire cheaper foreign workers to substitute for local workers, or employ automated manufacturing lines, techniques and tools to improve the quality of management, saving labor cost, reducing manufacturing time and increasing the productivity.

In an automated manufacturing line, different apparatus and tools are provided at different workstations and controlled to perform different works, such as processing, inspection, cleaning, assembling, quality control, warehousing and delivery. Further, carts and conveyers are used to transfer workpieces from one workstation to another so that a worker at each workstation can manually transfer workpieces and operate the respective machine tool to process each workpiece. CNC (Computer Numerical Control) and NC (Numerical Control) machine tools may be used in different workstations for shaping or machining metal or other rigid materials by cutting, boring, grinding, shearing or other forms of deformation. This manual workpiece transfer operation is time and labor consuming. In order to eliminate the problem, robot arms may be used in the manufacturing line.

A robot arm is practical for long-term operation to repeat exactly the same action over and over again with zero error, assuring a high level of processing quality. Further, a robot arm may be equipped with a pick-and-place device made in the form of a gripper, or a set of vacuum mounts for picking up and placing workpieces. However, commercial robot arms are expensive. It costs a lot to install a large amount of robot arms in multiple workstations in an automated manufacturing line.

Further, the pick-and-place device of a robot arm can be of air-driven or electric-driven design. When compared with an electric-driven type pick-and-place device, an air-driven type pick-and-place device has the advantages of high torque, low cost, long-term operation ability, low energy consumption and low maintenance cost. Thus, air-driven type pick-and-place devices are widely accepted in different industries. However, when multiple robot arms that are respectively equipped with an air-driven type pick-and-place device are used in multiple workstations in an automated manufacturing line, air supply lines must also be installed to connect the air-driven type pick-and-place devices of the robot arms to a compressed air source. The arrangement of these air supply lines is a problem. These air supply lines can easily be stretched by an external force, causing troubles. An improvement in this regard is desired.

SUMMARY OF THE INVENTION

The present invention has been accomplished under the circumstances in view. It is therefore the main object of the present invention to provide a mobile robotic trolley-based processing system and mobile robotic trolley thereof, which allows a highly automated consistent processing operation, increasing the processing efficiency, simplifying the production line and reducing the processing cost.

To achieve this and other objects of the present invention, a mobile robotic trolley-based processing system of the invention comprises a conveyor platform, at least one machine tool provided at one respective workstation at one side of the conveying track for processing profile materials, and at least one mobile robotic trolley movable along the conveyor platform for picking up and placing profile materials. The conveyor platform comprises a conveying track, a plurality of air supply valves arranged along the conveying track and connected to a gas supply pipeline, a gantry support unit comprising a catenary suspending above the conveying track, a water supply unit having a plurality of water nozzle tubes, and at least one conveyer extending along the conveying track for delivering profile materials. Each mobile robotic trolley comprises a trolley chassis supported on and movable along the conveying track, a plurality of connectors connectable to the air supply valves for conveying air, a pantograph mounted at the trolley chassis and kept in contact with the catenary for collecting power supply from the catenary, a drive control system mounted at the trolley chassis and having a transmission module linkable to an external central control system for receiving control signals from the external central control system, a cleaner mounted at the trolley chassis and controllable by the drive control system to clean profile materials, and a robot arm mounted at the trolley chassis and controllable by the drive control system to transfer profile materials among the conveyers, the cleaner and the machine tools. The cleaner comprises a cleaner tank for cleaning profile materials, and a water inlet pipe connectable to one water nozzle tube of the water supply unit.

Further, each mobile robotic trolley further comprises a connection device provided at a top side of each connector of the mobile robotic trolley for enabling the respective connector to be moved upward or downward relative to the trolley chassis by an external device. Thus, each connector is movable by the respective connection device into connection with one respective air supply valve for air supply. This design eliminates the use of any connection lines between the connectors and the air supply valves, avoiding connection line constraints. Thus, the invention greatly increases profile material processing precision. Further, the robot arm can be controlled to transfer each processed profile material to the cleaner tank of the cleaner for cleaning, saving much time, labor and cost. Thus, the invention allows a highly automated consistent processing operation, increasing the processing efficiency, simplifying the production line and reducing the processing cost.

Further, after one profile material is processed by one machine tool, the robot arm of one mobile robotic trolley can pick up the processed profile material and transfer it to the cleaner tank for cleaning, and then transfer the well cleaned profile material to one conveyer of the conveyor platform through a lift mechanism for conveying to a next workstation.

Preferably, the cleaner further comprises, a bracket having a swinging connector connected to the cleaner tank adjacent to the top open side of the cleaner tank, a cover plate connected to the bracket at a predetermined angle, a drive mounted outside the cleaner tank for driving the swinging connector to move the bracket and the cover plate within a predetermined angle between a close position where the cover plate closes the open side of the cleaner tank and an open position where the cover plate opens the open side of the cleaner tank, a spray nozzle mounted in the cleaner tank for spraying compressed air and cleaning solution, a drain pipe pivotally mounted in the bottom side of the cleaner tank for discharging unwanted water out of the cleaner tank, and a pneumatic cylinder horizontally mounted outside the cleaner tank and coupled to the drain pipe for moving the drain pipe within a predetermined angle. After cleaning of one profile material in the cleaner tank with a cleaning solution, the spray nozzle is controlled to spray a flow of compressed cleaning solution, removing dust, microparticles and oil films from the surface of the profile material. After cleaning with the compressed cleaning solution, the spray nozzle is controlled to spray a flow of clean dry air toward the cleaned profile material, drying the profile material. After the profile material is dried, the pneumatic cylinder of the cleaner is controlled to drive the swinging connector, moving the bracket and the cover plate upwardly to the open position again, and the robot arm is controlled to pick up the cleaned profile material from the bracket for follow-up treatment.

DETAILED DESCRIPTION OF THE PREFERRED EMBODIMENT

Referring to FIGS. 1-4, a mobile robotic trolley-based processing system and mobile robotic trolley thereof in accordance with the present invention is shown. The mobile robotic trolley-based processing system comprises a conveyor platform 1, at least one mobile robotic trolley 2, and at least one machine tool 3.

Figure 1:
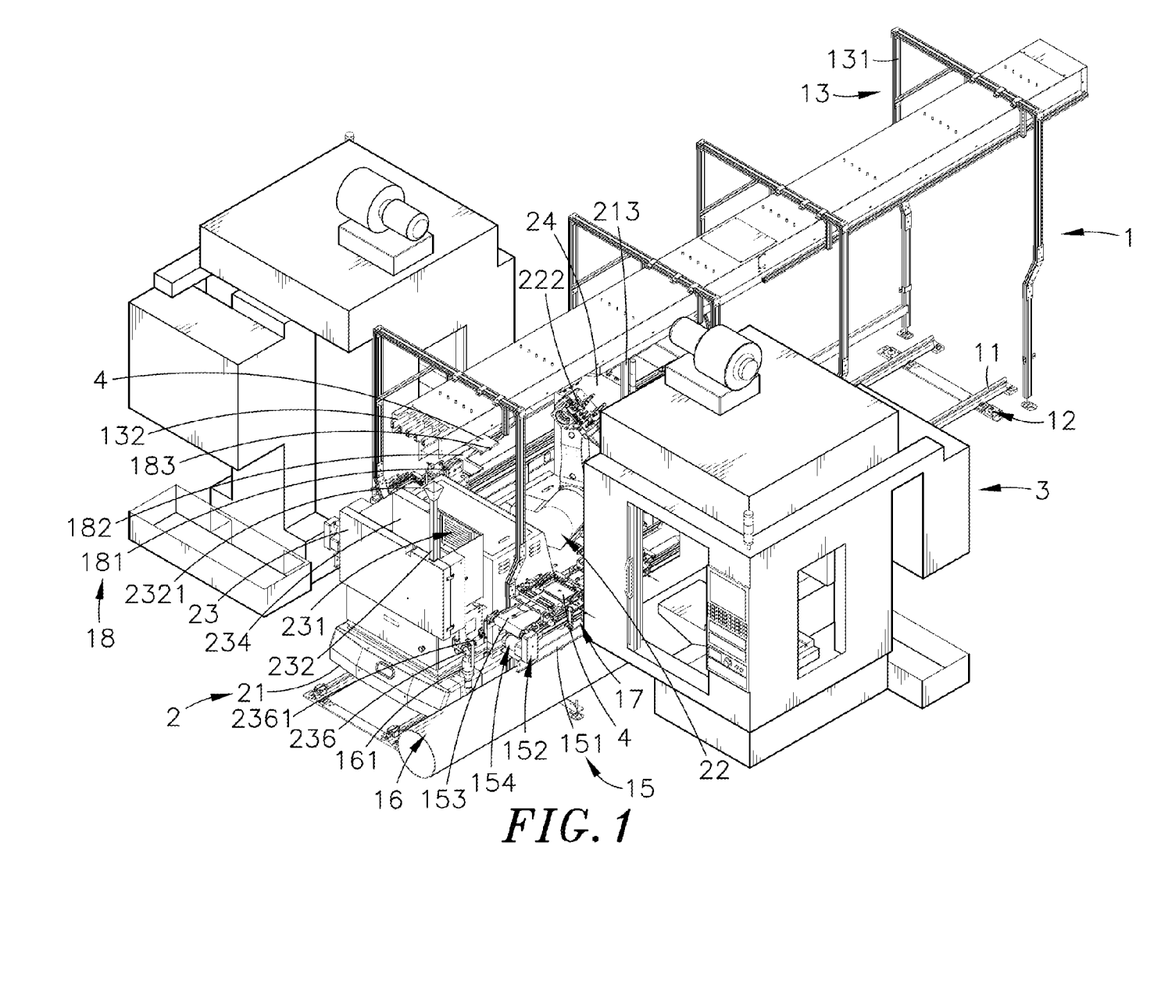
FIG. 1 is an oblique top elevational view of a part of a mobile robotic trolley-based processing system in accordance with the present invention.
Figure 2:
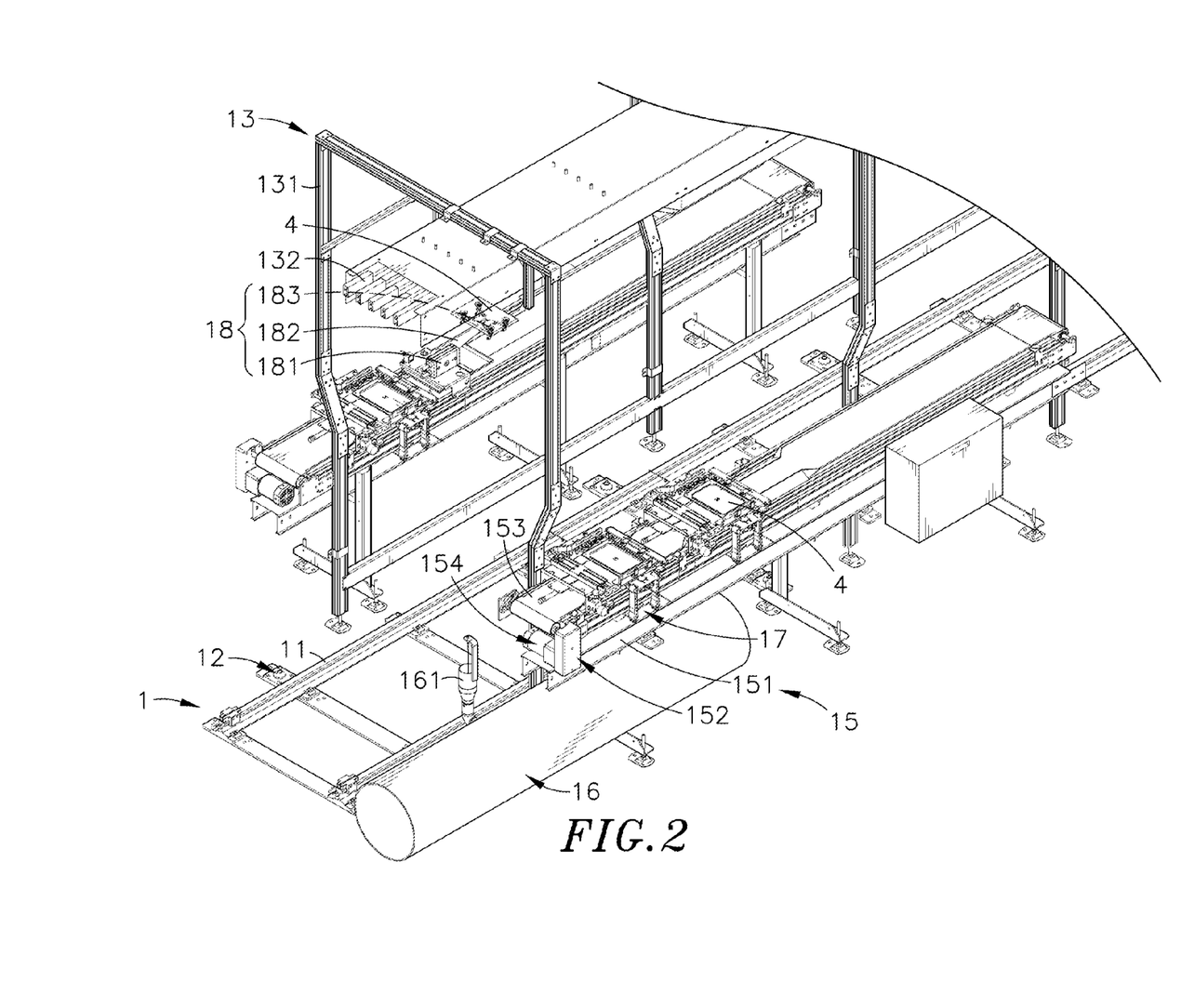
FIG. 2 is an oblique top elevational view of the conveyor platform of the mobile robotic trolley-based processing system in accordance with the present invention.
Figure 3:
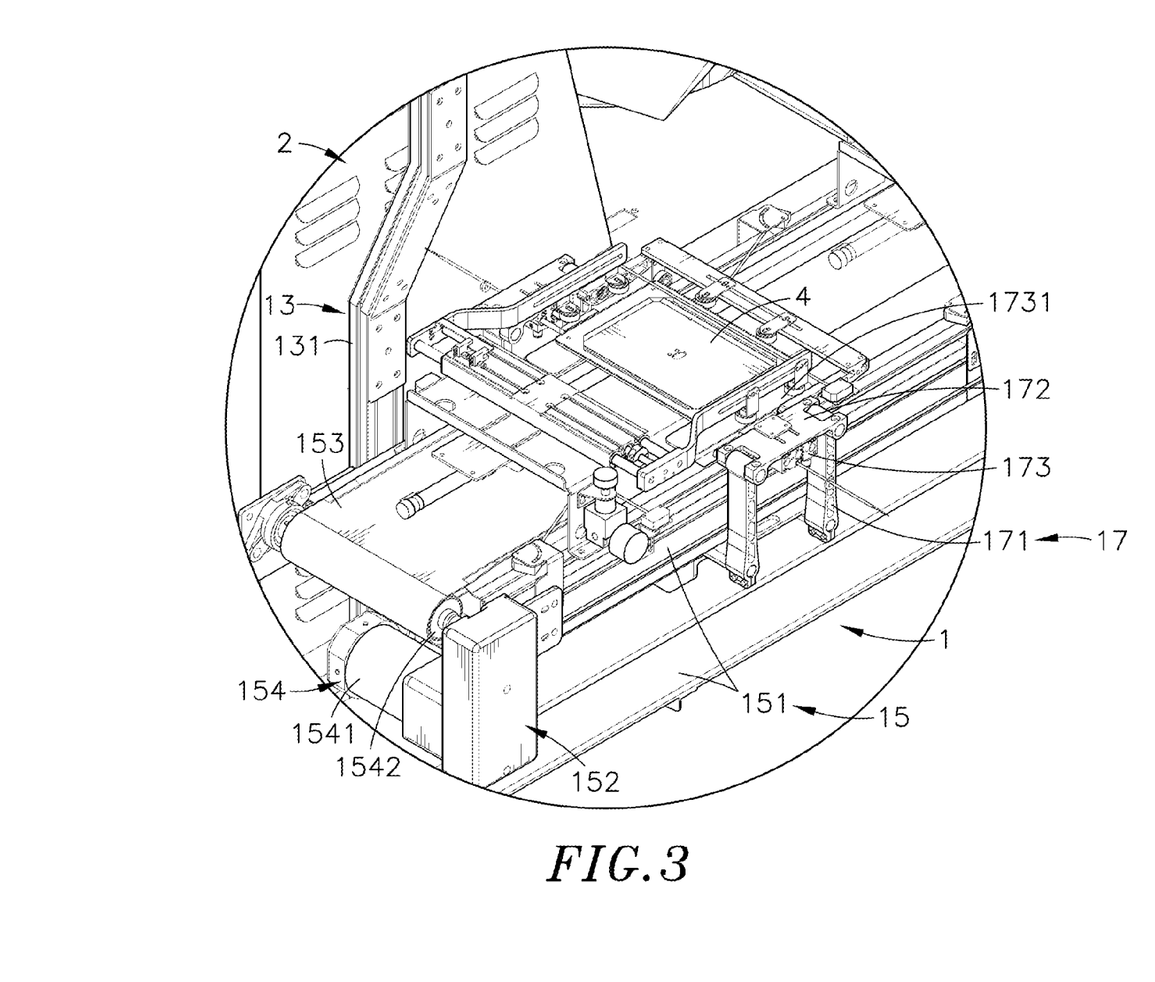
FIG. 3 is an enlarged view of a part of the conveyor platform shown in FIG. 2.
Figure 5:
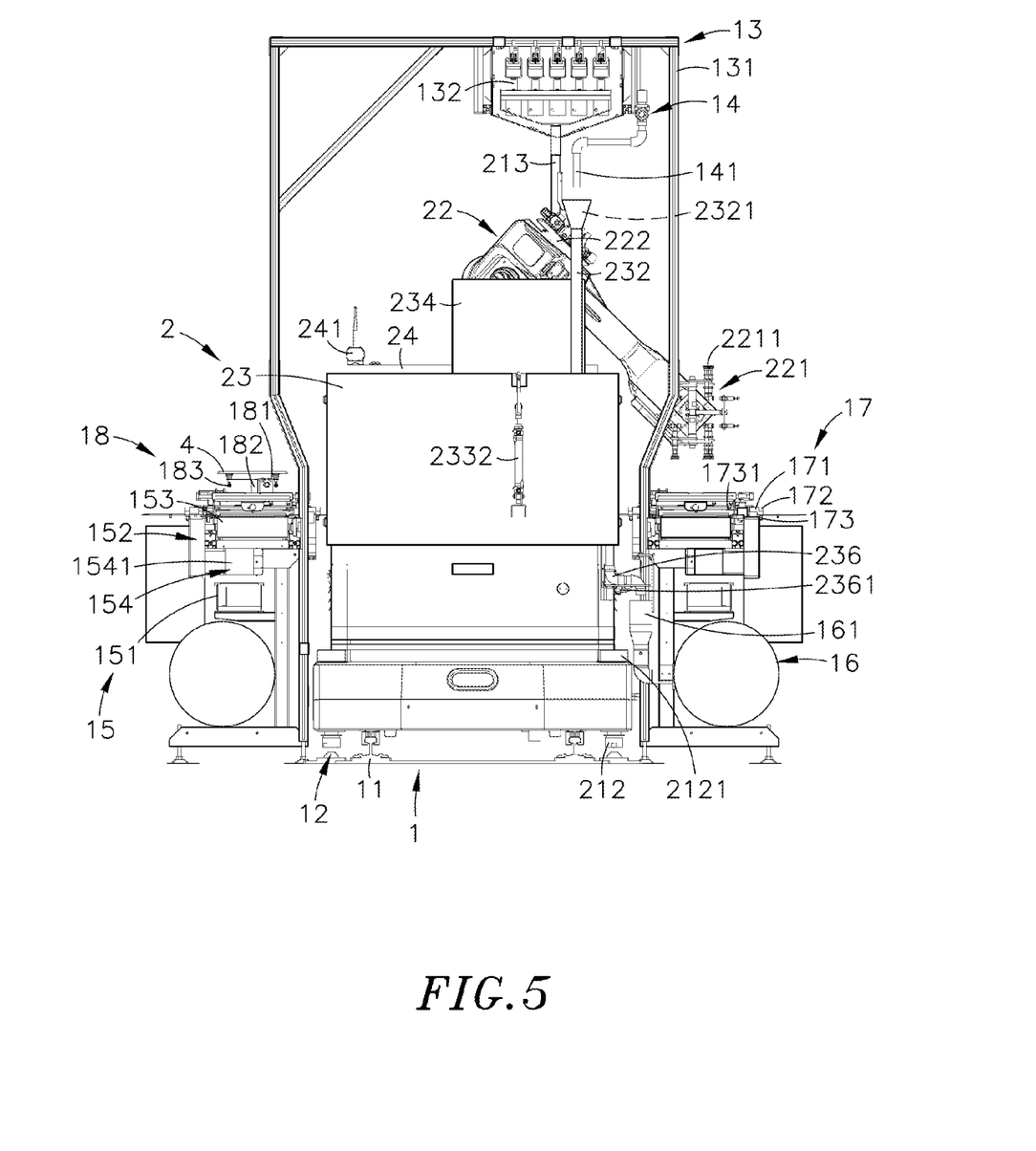
FIG. 5 is a front view of a part of the present invention, illustrating the relationship between the mobile robotic trolley and the conveyor platform.

The conveyor platform 1 comprises a conveying track 11 formed of two parallel steel rails (not shown), a plurality of air supply valves 12 arranged along at least one of two opposite lateral sides of the conveying track 11 and connected to a gas supply pipeline (not shown), a gantry support unit 13, which comprises a plurality of gantry supports 131 spaced along the conveying track 11 and a conductor rail, for example, catenary 132 suspended from the gantry supports 131 above the conveying track 11, and a water supply unit 14 having a plurality of water nozzle tubes 141 respectively mounted at the gantry supports 131 at one lateral side relative to the catenary 132 (see FIG. 5).

The conveyor platform 1 further comprises at least one, for example, two conveyers 15, a water discharge facility 16, a plurality of lift mechanisms 17, and a turnover mechanism 18. The two conveyers 15 are respectively mounted at two opposite lateral sides of the gantry support unit 13, each comprising a rack 151 and a conveying module 152 mounted at the rack 151. The conveying module 152 comprises a plurality of rollers 1542 rotatably mounted in the rack 151, a conveying belt 153 wound around the rollers 1542, and a power drive 154, for example, motor 1541 mounted in the rack 151 and controllable to rotate the rollers 1542 through chain transmission means (not shown). The water discharge facility 16 comprises a water pipe 161 mounted in the rack 151 of one conveyer 15 below the conveying module 152. The water discharge facility 16 is connected to a water pipeline of an external water recycling filter system (not shown). It is to be noted that the structural arrangement of the catenary 132 of the gantry support unit 13, the water supply unit 14 and the water discharge facility 16 can be variously embodied for providing clean dry air (CDA), power supply and water.

Further, one respective lift mechanism 17 is provided above the conveying belt 153 of the conveying module 152 of one respective conveyer 15 of the conveyor platform 1. The lift mechanism 17 comprises two pairs of swinging arms 171 respectively pivotally mounted at two opposite lateral sides of the rack 151 of the respective conveyer 15 and turnable by drive means (not shown) relative to the conveyer 15 within a predetermined angle, a linking plate 172 coupled between the two pairs of swinging arms 171 and suspending above the conveying belt 153 for curve shifting, a reciprocating moving device 173 mounted at the linking plate 172 and adapted for moving a lifting plate 1731 upward or downward to lift or release a profile material 4. The turnover mechanism 18 is mounted in one conveyer 15 of the conveyor platform 1 adjacent to the respective lift mechanism 17, comprising a rotary drive 181, a rotating member 182 suspending above the conveying belt 153 of the respective conveyer 15 and rotatable by the rotary drive 181 through 180° angle, and a plurality of suction heads 183 mounted at the rotating member 182 and controllable to suck up a profile material 4 from the lifting plate 1731 of the reciprocating moving device 173 or to release the profile material 4.

Figure 4:
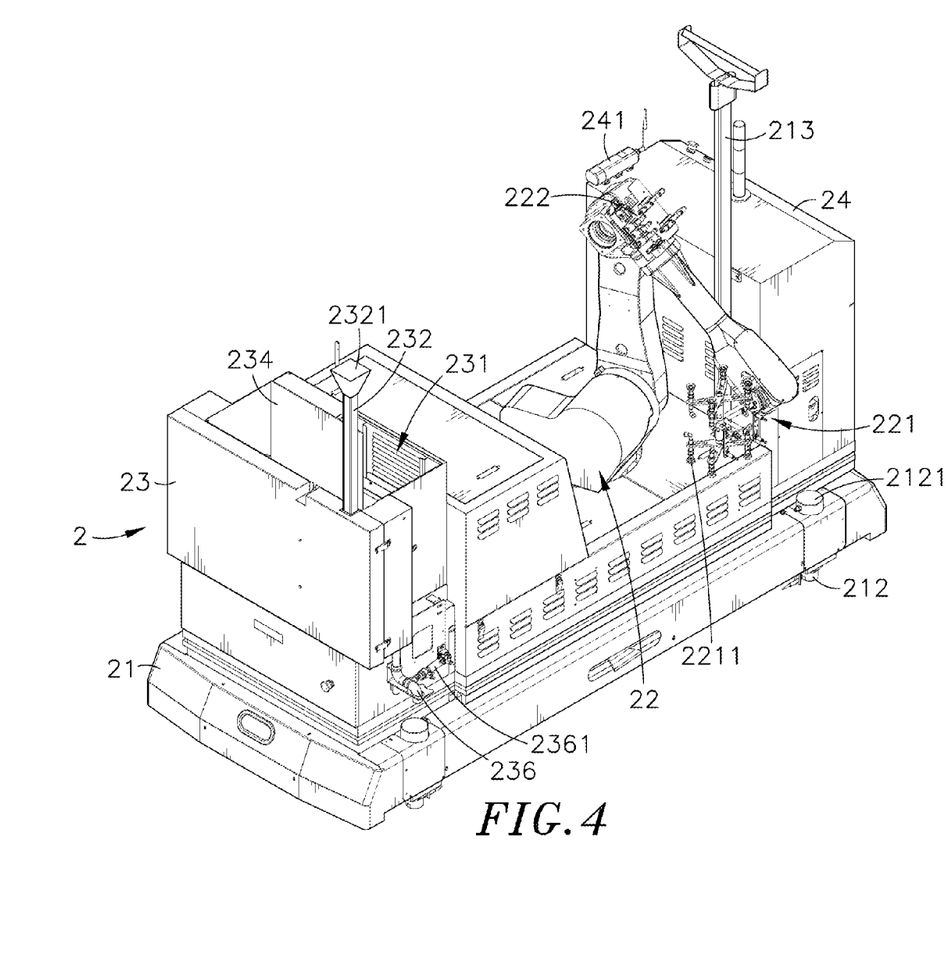
FIG. 4 is an oblique top elevational view of one mobile robotic trolley of the mobile robotic trolley-based processing system in accordance with the present invention.
Figure 6:
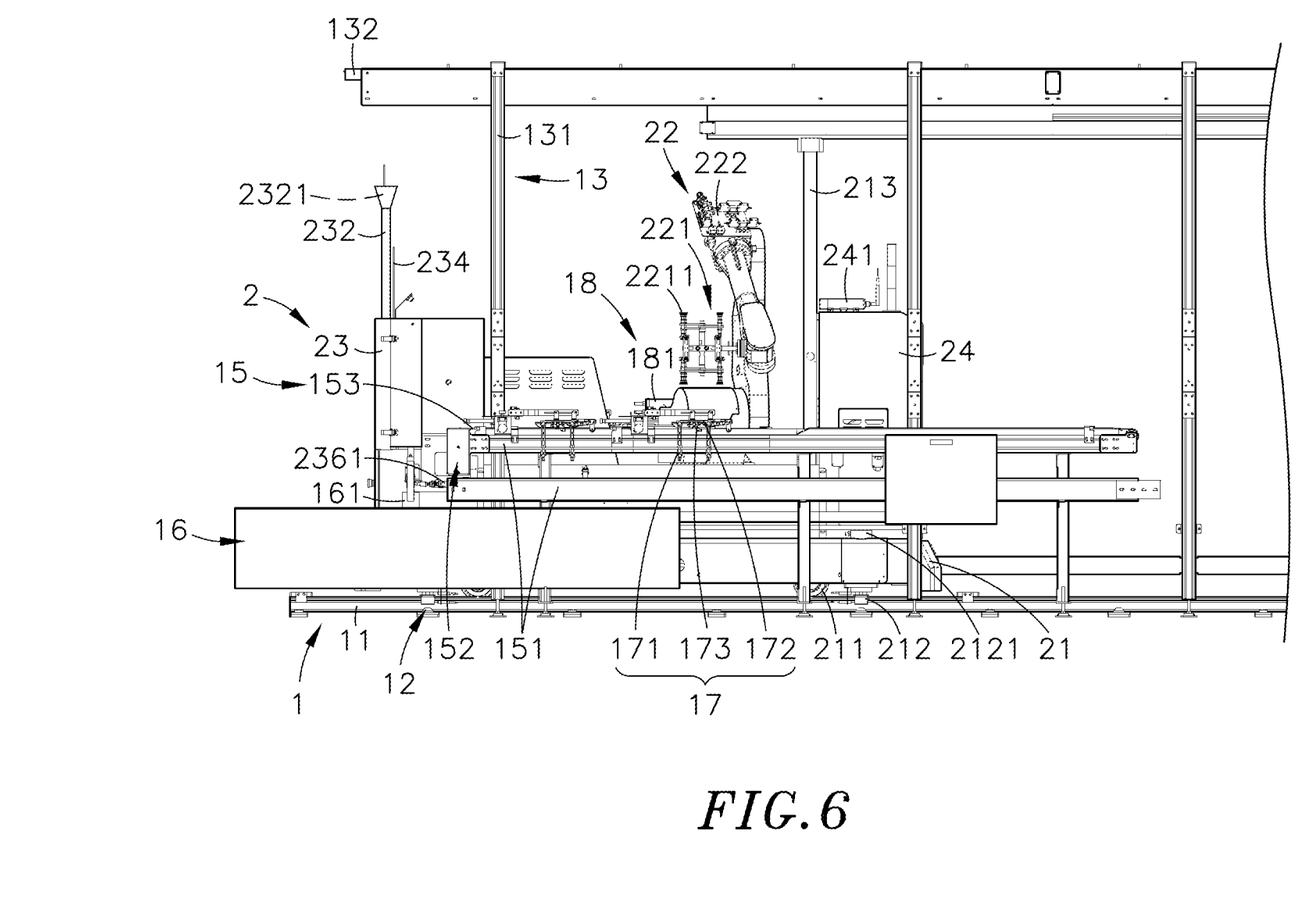
FIG. 6 is a side view of FIG. 5.

Each mobile robotic trolley 2 comprises a trolley chassis 21, a plurality of trolley wheels 211 rotatably and symmetrically mounted at the bottom side of the trolley chassis 21 (see FIGS. 5 and 6) and rotatable by a transmission mechanism (not shown), a plurality of connectors 212 in one or each of two opposite lateral sides of the trolley chassis 21 and movable up and down relative to the trolley chassis 21, a connection device 2121 located at a top side of each connector 212 for enabling the respective connector 212 to be moved upward or downward relative to the trolley chassis 21 by an external device, a power-collecting pole, for example, pantograph 213 mounted at the top side of the trolley chassis 21 at a selected location, a robot arm 22 mounted at the top side of the trolley chassis 21 and providing a pick-and-place device 221, a cleaner 23 mounted at one end of the top side of the trolley chassis 21, and a drive control system 24 mounted at an opposite end of the top side of the trolley chassis 21. The robot arm 22 and the cleaner 23 are electrically connected to the drive control system 24. Further, the robot arm 22 can be an articulated robot arm, polar robot arm, cylindrical robot arm, Cartesian robot arm, SCARA (Selective Compliance Assembly Robot Arm) robot arm or any other multi-axis robot arm selected subject to the actual application requirements.

Figure 7:
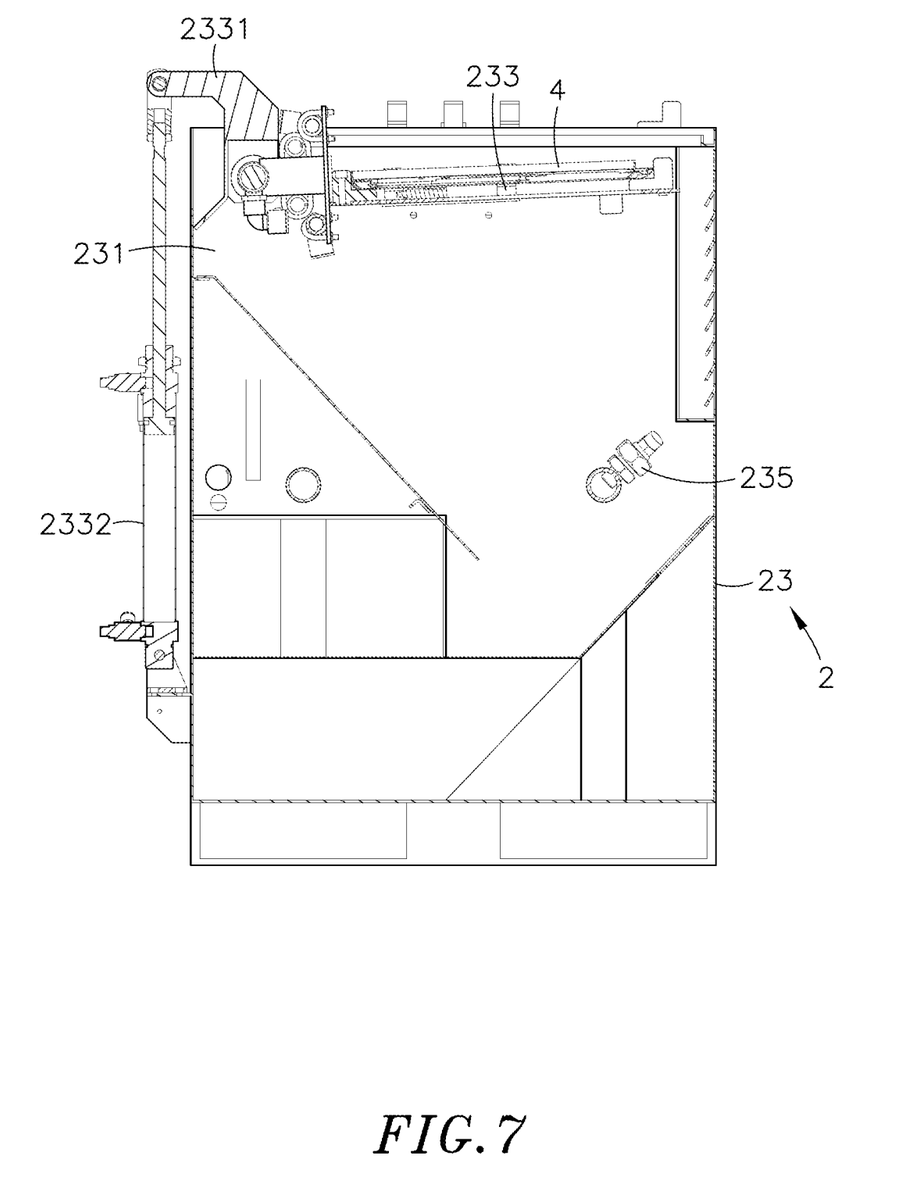
FIG. 7 is a sectional side view of the cleaner of the mobile robotic trolley of the mobile robotic trolley-based processing system in accordance with the present invention.

Further, the pick-and-place device 221 of the robot arm 22 can be made in the form of a gripper (not shown), or a set of suction heads 2211 (such as vacuum mounts). In this embodiment, the pick-and-place device 221 of the robot arm 22 is formed of a set of suction heads 2211. An air pressure distribution control system 222 is mounted at the robot arm 22 and connected with the suction heads 2211 through air tubes (not shown) for controlling the suction heads 2211 to pick up or release a profile material. Further, the cleaner 23 comprises a cleaner tank 231 for storing a cleaning solution (pure water, de-ionized water, or detergent and water mixture), a water inlet pipe 232 having a bottom end thereof mounted in the cleaner tank 231 and an opposite top end thereof extended to the outside of the cleaner tank 231 and terminating in a water filling hopper 2321, a bracket 233 having a swinging connector 2331 connected to the cleaner tank 231 adjacent to the top open side of the cleaner tank 231, a cover plate 234 connected to the bracket 233 at a predetermined angle, a drive, for example, pneumatic cylinder 2332 mounted outside the cleaner tank 231 and having a reciprocating rod thereof connected to the swinging connector 2331 for driving the swinging connector 2331 to move the bracket 233 and the cover plate 234 within a predetermined angle between a close position where the cover plate 234 closes the open side of the cleaner tank 231 and an open position where the cover plate 234 opens the open side of the cleaner tank 231, a spray nozzle 235 mounted in the cleaner tank 231 for spraying compressed air and cleaning solution, a drain pipe 236 pivotally mounted in the bottom side of the cleaner tank 231 for discharging unwanted water out of the cleaner tank 231, and a pneumatic cylinder 2361 horizontally mounted outside the cleaner tank 231 and coupled to the drain pipe 236 for moving the drain pipe 236 within a predetermined angle.

Further, the aforesaid drive control system 24 comprises a transmission module 241 for communication with an external central control system (not shown) either in a wired or wireless manner, so that the drive control system 24 can control the parameter setting and operation and monitor the operation of the trolley chassis 21, the robot arm 22 and the cleaner 23 subject to the control of the external central controls system. Further, the transmission module 241 can use a wired network interface, or a wireless Bluetooth, RF (radio frequency), Wi-Fi or Zigbee interface, or any other wired or wireless communication interface for communication with the external central controls system.

The aforesaid machine tool 3 can be a CNC (Computer Numerical Control) machine tool, such as CNC lathe machine, CNC milling machine, CNC drilling machine, CNC grinding machine, CNC electrical discharge machine, or any other NC (Numerical Control) machine tool for shaping or machining metal or other rigid materials by cutting, boring, grinding, shearing or other forms of deformation.

During installation of the mobile robotic trolley-based processing system, put each mobile robotic trolley 2 in the conveyor platform 1, enabling the trolley wheels 211 of each mobile robotic trolley 2 to be supported on the two parallel steel rails of the conveying track 11 and the pantograph 213 of each mobile robotic trolley 2 to collect power through contact with the catenary 132 of the gantry support unit 13.

Thus, each mobile robotic trolley 2 can be controlled by the respective drive control system 24 to move forward or backward along the conveying track 11 of the conveyor platform 1 to one selected machine tool 3 at one respective workstation at one side of one conveyer 15 for enabling the machine tool 3 to process each delivered profile material 4. Further, each machine tool 3 is linked to the external central control system by a wired or wireless communication interface and controlled by the external central control system to process each delivered profile material 4.

Referring to FIGS. 5-8, during application of the present invention, profile materials 4 are transferred to the conveying module 152 of each selected conveyer 15, and then the motor 1541 of the power drive 154 of the respective conveyer 15 is controlled to rotate the respective rollers 1542, thereby moving the respective conveying belt 153 to deliver the loaded profile materials 4. When one profile material 4 is delivered to the associating lift mechanism 17, the swinging arms 171 are driven to move the linking plate 172 relative to the rack 151 of the respective conveyer 15, and the lifting plate 1731 of the reciprocating moving device 173 is then driven to lift the profile material 4 from the conveying belt 153. Further, the conveying belt 153 of the conveying module 152 can also be controlled to deliver each profile material 4 to the robot arm 22 and then stopped, enabling the robot arm 22 to pick up the profile material 4.

Further, after one mobile robotic trolley 2 reaches a predetermined location, the water filling hopper 2321 of the water inlet pipe 232 of the cleaner 23 is aimed at one water nozzle tube 141 of the water supply unit 14, and then the pneumatic cylinder 2361 is controlled to bias the drain pipe 236 to the angular position where the opening of the drain pipe 236 faces downwardly toward the water pipe 161 of the water discharge facility 16, and then an electromagnetic valve and pump assembly (not shown) is controlled to pump waste cleaning solution out of the cleaner tank 231 through the drain pipe 236 and the water pipe 161 of the water discharge facility 16 for further filtering and recycling treatment. The waste cleaning solution discharging time is about 30~60 seconds. After discharge of waste cleaning solution, the electromagnetic valve and pump assembly is stopped, and then the pneumatic cylinder 2361 is controlled to reverse the drain pipe 236 to its former upward-facing position, and then the water supply unit 14 is controlled to discharge clean water or cleaning solution through the respective water nozzle tube 141 to the water filling hopper 2321 of the water inlet pipe 232 of the cleaner 23. This water filling time is about 60~120 seconds. Thus, subject to the function of the water supply unit 14 and the water discharge facility 16, the operation of filling water into or discharging water out of the cleaner 23 can be done automatically.

During operation of the control system 24 to move the robot arm 22 in picking up one profile material 4 from one conveyer 15 or lift mechanism 17, the air pressure distribution control system 222 controls the set of suction heads 2211 of the pick-and-place device 221 to pick up the profile material 4 and then to place the profile material 4 on the selected worktable of the machine tool 3, enabling the profile material 4 to be held down by a clamp of the machine tool 3. After the robot arm 22 is moved away from the machine tool 3, the material feed port cap (not shown) of the machine tool 3 is closed, and then the machine tool 3 is operated to cut, mill, drill or grind the profile material 4. After the processing work is completed, the material feed port cap of the machine tool 3 is opened again, and then the pick-and-place device 221 of the robot arm 22 is controlled to pick up the processed profile material 4 from the machine tool 3 and then to place the processed profile material 4 on the lifting plate 1731 of the reciprocating moving device 173 of the respective lift mechanism 17, and then the swinging arms 171 are driven to move the linking plate 172 relative to the rack 151 of the respective conveyer 15, enabling the processed profile material 4 to be transferred to the conveying belt 153 of the conveying module 152 of the respective conveyer 15. Thus, the robot arm 22 of each mobile robotic trolley 2 and each conveyer 15 of the conveyor platform 1 can be controlled to automatically transfer profile materials 4 to or from multiple machine tools 3.

Figure 8:
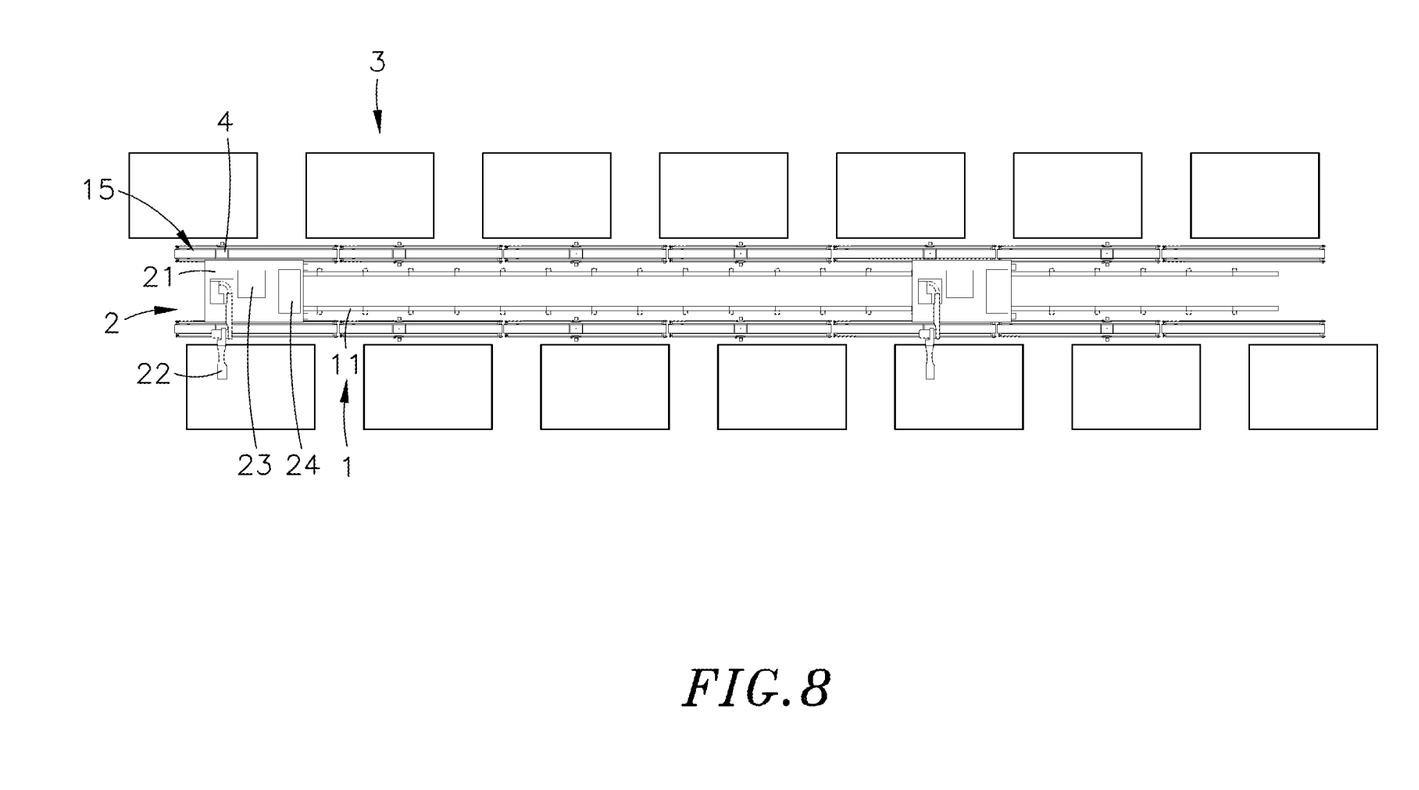
FIG. 8 is a schematic top plain view of the mobile robotic trolley-based processing system in accordance with the present invention.

Further, the aforesaid external central control system can simultaneously control the operation of the conveyor platform 1, multiple mobile robotic trolleys 2 and multiple machine tools 3. After the robot arm 22 of one mobile robotic trolley 2 picked up one processed profile material 4 from one machine tool 3, the cleaner 23 of the respective mobile robotic trolley 2 can be controlled to clean the processed profile material 4 prior to the transfer of the processed profile material 4 by the robot arm 22 to the respective lift mechanism 17. Further, the respective conveyer 15 can be stopped when the cleaner 23 of one mobile robotic trolley 2 is controlled to clean one processed profile material 4, and then started after the cleaning work of the processed profile material 4 and allocation of the cleaned processed profile material 4 on the conveying belt 153 of the conveying module 152 of the respective conveyer 15, enabling the cleaned processed profile material 4 to be delivered to a next workstation for further processing. When reached a next workstation, the respective lift mechanism 17 is operated in the same manner, enabling the robot arm 22 of the respective mobile robotic trolley 2 to transfer another profile material 4 to the machine tool 3 at this next workstation, or to pick up the processed profile material 4 from the machine tool 3.

Further, when cleaning one profile material 4, the control system 24 of the respective mobile robotic trolley 2 controls the pneumatic cylinder 2332 of the cleaner 23 to drive the swinging connector 2331, moving the bracket 233 and the cover plate 234 upwardly to the open position where the cover plate 234 opens the open side of the cleaner tank 231 of the cleaner 23, and then the robot arm 22 is operated to transfer the processed profile material 4 from the machine tool 3 to the bracket 233, and then the pneumatic cylinder 2332 of the cleaner 23 is controlled to drive the swinging connector 2331, moving the bracket 233 and the cover plate 234 downwardly to the close position where the cover plate 234 closes the open side of the cleaner tank 231 and the profile material 4 is carried by the bracket 233 into the inside of the cleaner tank 231. At this time, the spray nozzle 235 is controlled to spray a flow of compressed cleaning solution, removing dust, microparticles and oil films from the surface of the profile material 4. After cleaning with the compressed cleaning solution, the spray nozzle 235 is controlled to spray a flow of clean dry air toward the cleaned profile material 4 for drying the profile material 4. After the profile material 4 is dried, the pneumatic cylinder 2332 of the cleaner 23 is controlled to drive the swinging connector 2331, moving the bracket 233 and the cover plate 234 upwardly to the open position again, and the robot arm 22 is controlled to pick up the cleaned profile material 4 from the bracket 233 for follow-up treatment.

Further, after the cleaner 23 cleaned one profile material 4, the robot arm 22 can be controlled to transfer the profile material 4 to one lift mechanism 17 at the other conveyer 15. After the robot arm 22 is moved away from the lift mechanism 17, the suction heads 183 at the rotating member 182 of the turnover mechanism 18 are controlled to pick up the profile material 4, and then the rotary drive 181 is controlled to bias the rotating member 182 through 180°, turning the profile material 4 upside down, and the suction heads 183 are controlled to release the profile material 4, allowing the pick-and-place device 221 of the robot arm 22 to transfer the profile material 4 to the bracket 233 of the cleaner 23 or the machine tool 3 for cleaning or processing the opposite side of the profile material 4.

Because the trolley chassis 21 of each mobile robotic trolley 2 is supported on the conveying track 11 of the conveyor platform 1 and automatically movable along the conveying track 11 to every workstation and each connector 212 is movable by the respective connection device 2121 into connection with one respective air supply valve 12 for air supply, no further connection lines will be necessary, avoiding connection line constraints and allowing transfer of profile materials 4 between each mobile robotic trolley 2 and multiple machine tools 3. Thus, the invention greatly increases profile material processing precision. Further, the robot arm 22 can be controlled to transfer each processed profile material 4 to the cleaner tank 231 of the cleaner 23 for cleaning, saving much time, labor and cost. Thus, the invention allows a highly automated consistent processing operation, increasing the processing efficiency, simplifying the production line and reducing the processing cost.

In conclusion, the invention provides a mobile robotic trolley-based processing system comprising a conveyor platform 1, which comprises a conveying track 11, a plurality of air supply valves 12 arranged along two opposite lateral sides of the conveying track 11 and connected to a gas supply pipeline, a gantry support unit 13 providing a catenary 132, a water supply unit 14 providing a plurality of water nozzle tubes 141 and conveyers 15 for conveying profile materials 4, mobile robotic trolleys 2 each comprising a wheeled trolley chassis 21 supported on and movable along the conveying track 11 of the conveyor platform 1, connectors 212 connectable to the air supply valves 12 for collecting compressed air, a pantograph 213 kept in contact with the catenary 132 for collecting electrical power, a robot arm 22 for transferring profile materials 4 individually, a cleaner 23 having a water inlet pipe 232 connectable to one water nozzle tube 141 of the water supply unit 14 for collecting water or cleaning solution for cleaning each profile material 4 and a drive control system 24 for controlling the operation of the robot arm 22 and the cleaner 23, and machine tools 3 for processing profile materials 4 being transferred by the conveyers 15 and the robot arms 22 of the mobile robotic trolleys 2. Thus, the mobile robotic trolley-based processing system is capable of performing a highly automated consistent processing operation, assuring a high level of processing quality and increasing the processing efficiency.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A mobile robotic trolley-based processing system, comprising:
   a conveyor platform comprising a conveying track, a plurality of air supply valves arranged along said conveying track and connected to a gas supply pipeline, a gantry support unit, said gantry support unit comprising a catenary suspending above said conveying track, a water supply unit having a plurality of water nozzle tubes and at least one conveyer extending along said conveying track for delivering profile materials;

at least one machine tool provided at one side of said conveying track for processing profile materials; and at least one mobile robotic trolley, each said mobile robotic trolley comprising a trolley chassis supported on and movable along said conveying track, a plurality of connectors connectable to said air supply valves for conveying air, a pantograph mounted at said trolley chassis and kept in contact with said catenary for collecting power supply from said catenary, a drive control system mounted at said trolley chassis, said drive control system comprising a transmission module linkable to an external central control system for receiving control signals from said external central control system, a cleaner mounted at said trolley chassis and controllable by said drive control system to clean profile materials, said cleaner comprising a cleaner tank for cleaning profile materials and a water inlet pipe connectable to one said water nozzle tube of said water supply unit, and a robot arm mounted at said trolley chassis and controllable by said drive control system to transfer profile materials among said conveyers, said cleaner and said machine tools, and wherein said air supply valves are arranged along two opposite lateral sides of said conveying track; said gantry support unit comprises a plurality of gantry supports spaced along said conveying track; said catenary is suspended from said gantry supports above said conveying track; and said water nozzle tubes are respectively mounted at said gantry supports.

2. The mobile robotic trolley-based processing system as claimed in claim 1, wherein each said conveyer comprises a rack and a conveying module mounted at said rack; said conveyor platform further comprises a water discharge facility, said water discharge facility comprising a water pipe mounted in the rack of each said conveyer below the respective said conveying module; each said mobile robotic trolley further comprises a drain pipe pivotally mounted in a bottom side of said cleaner tank for discharging water out of said cleaner tank into said water pipe of said water discharge facility.

3. The mobile robotic trolley-based processing system as claimed in claim 2, wherein said conveying module of each said conveyer comprises a plurality of rollers rotatably mounted in the rack thereof, a conveying belt wound around said rollers, and a power drive mounted in the rack thereof and controllable to rotate said rollers in moving said conveying belt.

4. The mobile robotic trolley-based processing system as claimed in claim 2, wherein each said mobile robotic trolley further comprises a pneumatic cylinder horizontally mounted outside said cleaner tank and coupled to said drain pipe and controllable to move said drain pipe within a predetermined angle.

5. The mobile robotic trolley-based processing system as claimed in claim 2, wherein said conveyor platform further comprises a plurality of lift mechanisms respectively provided above the conveying belt of the conveying module of each said conveyer, each said lift mechanism comprising two pairs of swinging arms respectively pivotally mounted at two opposite lateral sides of the rack of one respective said conveyer and turnable relative to the respective said conveyer within a predetermined angle, a linking plate coupled between said two pairs of swinging arms and suspending above the conveying belt of the respective said conveyer for curve shifting, a reciprocating moving device mounted at said linking plate and adapted for moving a lifting plate thereof upward or downward to lift or release a profile material.

6. The mobile robotic trolley-based processing system as claimed in claim 5, wherein said conveyor platform further comprises a turnover mechanism mounted in one said conveyer adjacent to one said lift mechanism, said turnover mechanism comprising a rotary drive, a rotating member suspending above the conveying belt of the respective said conveyer and rotatable by said rotary drive, and a plurality of suction heads mounted at said rotating member and controllable to suck up a profile material from said lifting plate of said reciprocating moving device.

7. The mobile robotic trolley-based processing system as claimed in claim 1, wherein each said mobile robotic trolley further comprises a plurality of trolley wheels pivotally mounted at a bottom side of said trolley chassis and rotatably supported on said conveying track and movable along said conveying track, and a connection device connected to a top side of each said connector and adapted for moving the respective said connector up and down relative to said trolley chassis.

8. The mobile robotic trolley-based processing system as claimed in claim 1, wherein said robot arm of each said mobile robotic trolley is selected from the group of articulated robot arm, polar robot arm, cylindrical robot arm, Cartesian robot arm and SCARA (Selective Compliance Assembly Robot Arm) robot arm, comprising a pick-and-place device equipped with a set of suction heads for picking up a profile material.

9. The mobile robotic trolley-based processing system as claimed in claim 1, wherein said cleaner of each said mobile robotic trolley further comprises a bracket having a swinging connector connected to said cleaner tank adjacent to a top open side of said cleaner tank, a cover plate connected to said bracket at a predetermined angle, a drive mounted outside said cleaner tank and adapted for driving said swinging connector to move said bracket and said cover plate within a predetermined angle between a close position where said cover plate closes the top open side of said cleaner tank and an open position where said cover plate opens the top open side of said cleaner tank, and a spray nozzle mounted in said cleaner tank for spraying compressed air and cleaning solution.

10. The mobile robotic trolley-based processing system as claimed in claim 1, wherein said transmission module of said drive control system comprises an interface selected from the group of wired network interface, wireless Bluetooth interface, RF (radio frequency) communication interface, Wi-Fi interface and Zigbee interface for communication with said an external central control system.

11. The mobile robotic trolley-based processing system as claimed in claim 1, wherein each said machine tool is selected from the group of CNC (Computer Numerical Control) machine tools and NC (Numerical Control) machine tools for shaping and machining metal and rigid materials.

* * * * *